H. J. KLINE.
INTERNAL COMBUSTION ENGINE.
APPLICATION FILED JULY 29, 1911.
1,170,276.
Patented Feb. 1, 1916.
3 SHEETS—SHEET 2.
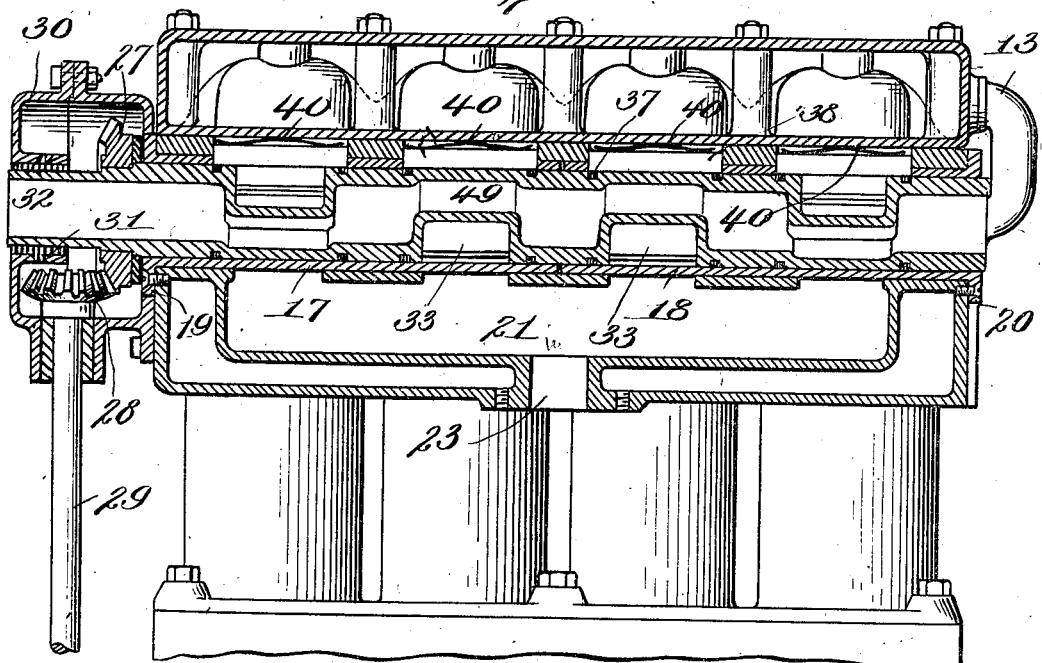
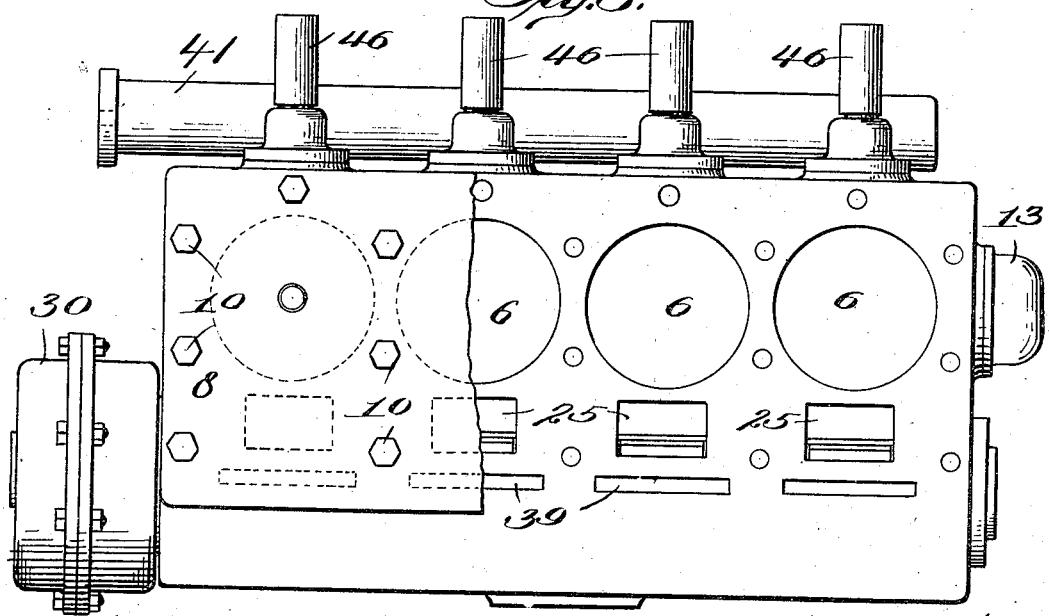

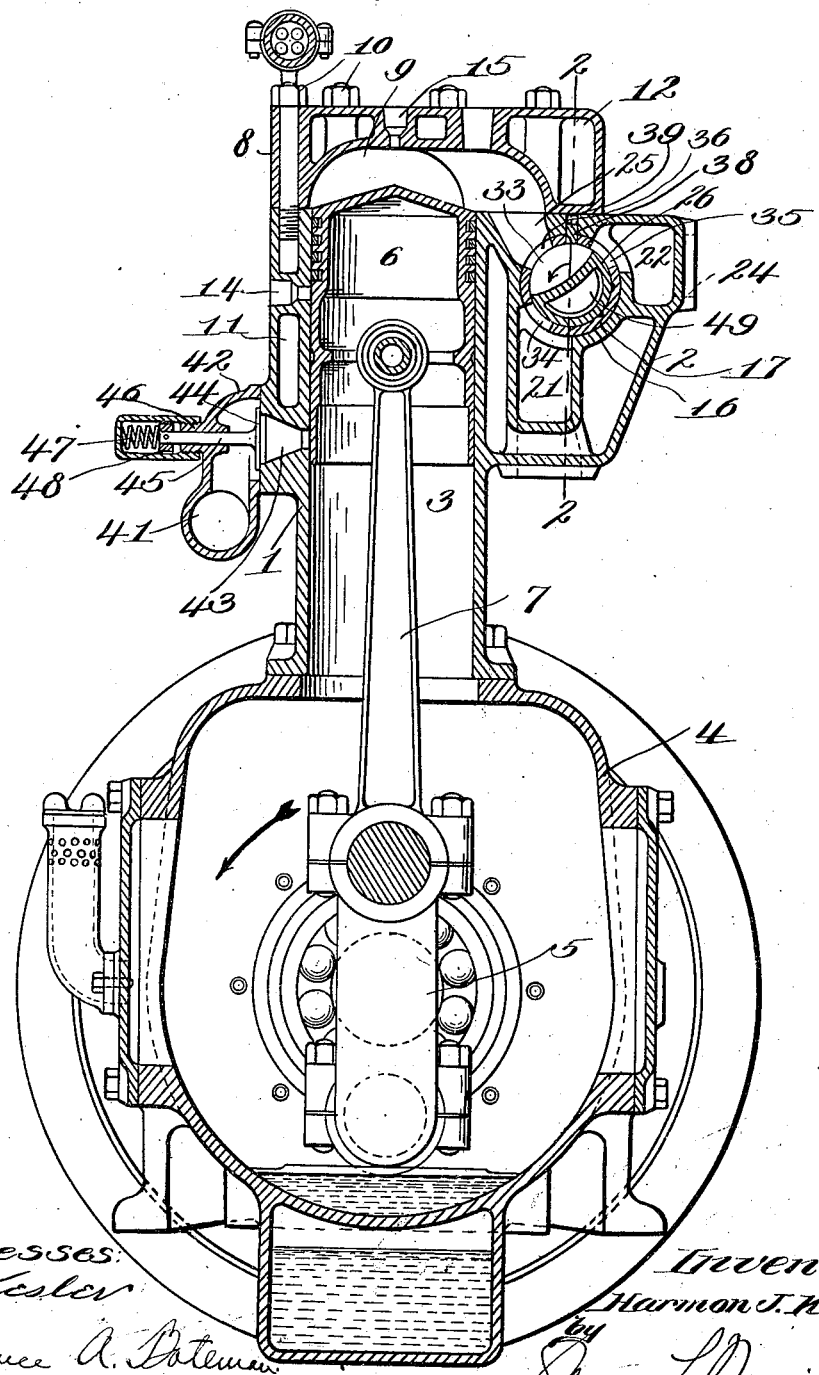

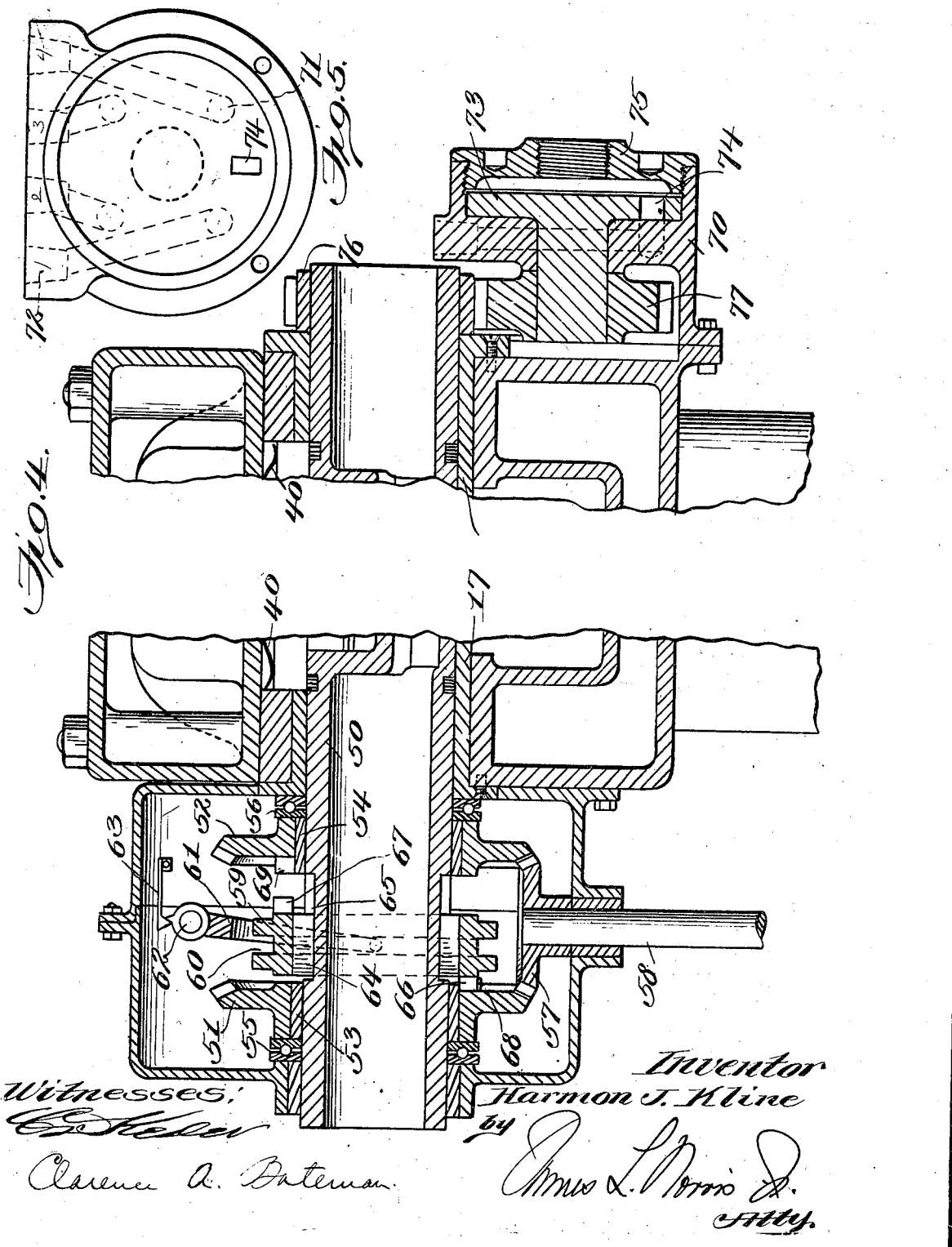

ably the entire page

UNITED STATES PATENT OFFICE.

HARMON J. KLINE, OF ALPENA, MICHIGAN.

INTERNAL-COMBUSTION ENGINE.

1,170,276. Specification of Letters Patent. Patented Feb. 1, 1916.

Application filed July 29, 1911. Serial No. 641,320.

*To all whom it may concern:*

Be it known that I, HARMON J. KLINE, a citizen of the United States, residing at Alpena, in the county of Alpena and State of Michigan, have invented new and useful Improvements in Internal-Combustion Engines, of which the following is a specification.

My present invention relates to improvements in internal combustion engines, and more particularly to those of the four-cycle type, and it has for its object primarily to provide a practical and improved valve construction for engines of this type which will avoid the expense and difficulties incident to the use of puppet valves and cam mechanism, a rotary valve being provided, according to the present invention, which serves to control the inlet of the fuel gas and the discharge of the exhaust gases, this valve and its related parts being so constructed and mounted with reference to the engine casing that proper packing and lubrication are insured, accurate timing of the valve can be readily produced and wear compensated for, if necessary, undue heating of the valve is avoided, and the construction and proper maintenance of the valve are facilitated.

Another object of the invention is to provide in connection with a rotary valve of this type, reversing means which is relatively simple and is capable of being easily adjusted whereby the valve may be driven in either direction according to the direction of motion of the crank shaft of the engine, an air distributing valve being also preferably connected operatively to the valve so as to be driven therefrom, and this air distributing valve is adapted to introduce the compressed air into the different engine cylinders at appropriately timed intervals for starting purposes.

A further object of the invention is to provide a simple and efficient auxiliary exhaust valve to assist the rotary valve in discharging the exhaust gases, this auxiliary exhaust valve being so constructed and placed that it may be manufactured cheaply and applied with facility. It will cause removal of any residue from the engine cylinder, and this exhaust valve is readly accessible for adjustment or other purposes.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a transverse vertical section through one of the cylinders of an engine constructed in accordance with the preferred embodiment of my invention; Fig. 2 represents a section on the line 2—2 of Fig. 1; Fig. 3 represents a top plan view of the engine, a portion of the head being broken away; Fig. 4 represents a longitudinal section of the upper portion of the engine showing the ends thereof in detail and provided with reversing mechanism and also with an air distributing valve; and Fig. 5 is a detail view of the air distributing valve.

Similar parts are designated by the same reference characters in the several views.

Valve mechanism embodying the present invention is capable of being applied to internal combustion engines of various types. In the present instance I have shown as an application of one embodiment of the invention, a multiple cylinder four-cycle engine adapted to use hydrocarbon or other suitable gaseous fuel. In the particular form of engine shown, the cylinders are cast *en-bloc*, that is, the cylinders are formed in a single or integral casting 1 having an offset 2 arranged at one side of the axes of the cylinders 3, the offset in the casing being adapted to contain the primary valve to be hereinafter described. The bottom of the cylinder casting is bolted or otherwise secured to the top of a crank case 4, the latter containing the usual crank shaft 5, and the crank shaft is connected as usual to each piston 6 by a connecting rod 7. The usual or any other desired methods of constructing the crank shaft, pistons and connecting rods, and providing for lubrication of these parts, may be used. The cylinders within which the pistons operate are open at the top of the casting 1, a head 8 being provided which is preferably common to all the cylinders and is removably secured to the top of the casting 1. The head has a combustion chamber 9 positioned above and corresponding to each cylinder, and the head in the present instance is firmly secured in position by a number of suitably placed bolts 10. The casting 1 is in the present instance formed with a jacket 11 for the circulation of water for cooling purposes and the head 8 is also formed hollow to provide a jacket 12 for the circulation of water, the two jackets being connected by the fitting 13 so as to insure uniform and complete circulation of the water. Openings 14 and 15 may be formed in the cylinder casting and the head to provide for the attachment of relief and priming cocks, respectively.

According to the present invention, the offset 2 of the cylinder casting is formed with a valve casing 16, this casing in the present instance being of cylindrical form and may be formed accurately by boring. A pair of bushings 17 and 18 are introduced into the valve casing 16 from the opposite ends thereof, the inner ends of the bushings abutting or lying in close relation, preferably about midway of the length of the valve casing, and the outer ends of the bushings are formed with flanges 19 and 20 adapted to receive screws or other means for securing the bushings in proper position. The offset 2 of the cylinder casting is cored to form an intake manifold or passage 21 and an exhaust manifold or passage 22, the intake manifold being wholly inclosed within the exterior walls of the offset and is inclosed on three sides by a portion of the cooling jacket of the cylinder casting, while the exhaust manifold has the walls exposed. Preferably, the intake manifold is arranged almost directly below the valve chamber, it having an inlet 23 through which the fuel gas is introduced, and the exhaust manifold is preferably located at the outer side of the valve casing and has a discharge opening 24. The upper portion of the intake manifold is cored with an opening leading to the valve casing 16, and the inner part of the exhaust manifold is cored with an opening which also leads to the valve casing. The cylinder casting is also cored or otherwise formed with a passage 25 which leads diagonally downwardly and outwardly from the combustion chamber 9 of the head and into the valve chamber 16, it being understood that a passage 25 and an opening in the intake manifold and an opening in the exhaust manifold will be provided for each cylinder of the engine.

The admission of gas to the cylinder and the exhausting of the products of combustion are controlled by a rotary valve 26 which preferably extends throughout the length of the offset 2 of the cylinder casting and it has a suitable fit within the bushings 17 and 18 contained in the valve casing 16. This valve when used in connection with a four-cycle engine is driven at half the speed of the crank or engine shaft and any suitable means may be provided for imparting continuous rotation to the valve at the proper speed. In the present instance, one end of the valve projects beyond the engine casing and has a bevel gear 27 fixed thereto, this bevel gear coöperating with a bevel pinion 28 carried by a vertical drive shaft 29, and this shaft may be appropriately geared to the crank or engine shaft. A divided casing 30 is shown incasing the driving gear for the valve, one section of the casing having a bushed bearing 31 which coöperates with a journal extension 32 formed on the exposed or projecting end of the valve. The valve has a portion of its circumference cut out to provide a passage for the gas to and from each cylinder, each cut-out in the present instance being in the form of a segmental recess 33, and this recess during rotation of the valve alternately establishes communication between the intake manifold 21 and the passage 25 communicating with the cylinder and between the passage 25 and the exhaust passage or manifold 22, a suitable lap being provided for the valve between the periods when the cylinder is receiving a charge of fresh gas and is exhausting the products of combustion, for the compression and explosion of the charge. The timing of the cycles for each cylinder preferably corresponds to the timing employed in ordinary four-cycle engines, and accuracy in the timing is insured by the use of the inserted bushings 17 and 18 which have for each cylinder, an inlet port 34, an exhaust port 35, and a port 36 which communicates with the explosion or combustion chamber of the cylinder, it being possible to cut or otherwise form the ports in the bushing with accuracy before it is inserted into the engine, and hence, accuracy in the coring of the passage 25 and the openings leading from the manifolds or passages 21 and 22 is unnecessary.

Leakage of the gas in a direction longitudinally of the rotary valve is prevented by a suitable number of packing rings 37 which are preferably seated in circumferential grooves in the valve, a pair of these packing rings being preferably placed at opposite sides of each recess 33 of the valve, and these packing rings also serve to retain the lubricating oil between them whereby the valve will float on films of oil. Leakage of gas in a direction circumferentially of the valve is also prevented in the present instance by providing a packing strip 38 which in the present instance is inserted in a vertical slot 39 which leads downwardly from the top of the offset part of the cylinder casting and through a longitudinal slot in the bushing 17 or 18, each of these packing strips being held in proper relation to the periphery of the valve by a suitable spring 40 which is contained in the upper portion of the recess 39 and is held under compression by the head 8 when the latter is in position. When, however, the head is removed from the cylinder casting, the several longitudinal packing strips and their springs are exposed, and these parts may be easily removed.

It is preferable to employ an auxiliary exhaust valve to assist the primary or rotary valve in discharging the exhaust gases from the several cylinders of the engine. I provide a simple and efficient auxiliary exhaust valve for this purpose which is of the puppet type, and the several valves for the different cylinders may all be carried by an auxiliary exhaust manifold 41, the manifold having a branch 42 which is adapted to be bolted to the cylinder casting directly outside of each cylinder and to communicate with an auxiliary exhaust port 43 which is formed in the cylinder and in a position where it will be covered by the piston, except when the piston reaches approximately the limit of its outward or power stroke, when the auxiliary exhaust port will be uncovered by the piston acting as a valve, and the auxiliary exhaust valve will open and permit the major portion of the consumed gases at high pressure to escape. The auxiliary exhaust valve embodies a head 44 which is preferably flat and seats directly against a flat surface formed for this purpose on the exterior of the cylinder casting, the valve having a stem 45 which operates through a sleeve 46 formed as a part of the manifold, the sleeve acting as a guide to insure proper seating of the valve, and a compression spring 47 bears upon the outer end of the valve stem to yieldably hold it upon its seat, allowing the valve to open only when the piston substantially reaches the limit of its power stroke after an explosion. The spring 47 is held in position by a cup-like cap 48 which incloses the spring in the outer end of the valve stem and has a gas-tight connection with the manifold 41. Preferably, the cap 48 is threaded upon the outer end of the sleeve-like portion 46 of the manifold, such a construction preventing the escape of the exhaust gases to the exterior of the manifold, and the thread connection also enables the cap 48 to be adjusted to vary the power of the spring 47. While the auxiliary valve discharges a considerable portion of the consumed gases, the completion of the exhaust of the consumed gases is effected by the primary or rotary valve during the return stroke of the piston, Fig. 1 of the drawing showing the valve in the position it occupies just after the exhausting of the consumed gases has been completed, the valve being about to close the exhaust port 35 and to establish communication between the intake port 34 and port 36 which leads to the cylinder.

The rotary valve is preferably formed hollow to provide a passage 49 for the flow or circulation of a suitable cooling medium, the two ends of this passage being open at the exterior of the engine in the present instance to permit the circulation of air from the atmosphere, although it is obvious that this passage of the valve could be connected to the water circulating system of a water-cooled engine. By ventilating or cooling the valve, undue heating thereof is prevented.

Efficient lubrication is essential to the successful operation of a rotary valve applied to internal combustion engines and the present invention provides for this, those portions of the valve between adjacent cylinders operating in bearings, as shown, to which bearings oil may be fed in any suitable manner, but preferably under pressure, and a suitable amount of oil is retained in each bearing which presents a continuous bearing surface by the respective packing rings 37, and hence the valve will float on oil films. Those portions of the valve in line with the cylinder, intake and exhaust ports will be lubricated by oil coming over from the cylinder port and such oil as will leak past the packing rings from the adjacent valve bearings.

In some cases, it may be preferable to provide a reversing gear for the rotary valve whereby the engine may be operated in either direction. Such an arrangement is shown in Fig. 4 wherein the projecting end of the rotary valve 50 which corresponds substantially in construction to that of the valve 26 in the previously described embodiment has a pair of reversely arranged bevel gears 51 and 52 revolubly journaled thereon, bushings 53 and 54 being interposed between the gears and the valve in the present instance, and anti-friction thrust bearings 55 and 56 are placed behind each of these bevel gears. A bevel pinion 57 meshes with both of the bevel gears 51 and 52 and during the running of the engine the two bevel gears 51 and 52 are revolved in reverse directions on the valve. The driving pinion 57 is fixed to an operating shaft 58 and the latter may be geared or otherwise connected to the engine shaft in the same manner as the shaft 29 in the former instance. The bevel gears 51 and 52 are alternately connected to the valve 50 according to the direction of rotation of the engine shaft so as to always revolve the valve in the same direction. To accomplish this result, an axially shiftable collar 59 is in the present instance mounted on the projecting portion of the valve 50 and is interposed between the bevel gears 51 and 52. This collar is provided with a circumferential groove 60 which coöperates with a clutch fork 61, the latter being mounted on a shaft 62 which may be rotated or rocked to shift the clutch by a handle or any other suitable means, a spring latch 63 being provided to normally retain the clutch in either of its two shifted positions.

The collar 59 has a driving connection with the valve although it is capable of shifting axially thereon. A spline connection is shown in the present instance, the collar having a key 64 which operates in an axial key-way 65 in the valve. The collar has clutch jaws 66 and 67 which project from opposite sides thereof and in the present instance at diametrically opposite points, the clutch jaw 66 being arranged to engage and establish a driving connection with a complemental clutch jaw 68 on the gear 51 while the clutch jaw 67 is adapted to coöperate with a complemental clutch jaw 69 formed on the gear 52. By shifting the collar 59 toward one or another of the gears 51 and 52, motion is transmitted from the respective gear to the collar and from the latter to the valve, and rotation of the valve in the same direction while the engine shaft is turning in a reverse direction is readily effected simply by shifting the clutch collar. The rotary valve is also utilized in this embodiment of the invention to operate a compressed air distributing valve which forms part of a starting mechanism for the engine. The distributing valve may be of different forms, that shown comprising a casing 70 which is attached to a suitable part of the engine casing and is formed with a circular seat provided with circularly spaced ports 71 which correspond in number to the number of cylinders, a set of connections 72 being provided corresponding in number to the ports whereby the compressed air may be conducted from each port of the corresponding cylinder of the engine. A rotary valve 73 is mounted in the casing and contains a port 74 which successively supplies air to the ports 71. The front of the casing is closed by a cover 75 which may be tapped as shown for the attachment of the compressed air supply pipe. This compressed air distributing valve is driven at the same speed as the rotary valve of the engine which controls the admission and exhaust of the gases and the predetermined relation which exists between the timing of the ports in the main valve of the engine and those of the distributing valve is maintained in the present instance by gearing which directly connects the main and air distributing valves, the former valve having a gear 76 thereon which coöperates with a gear 77 which latter gear is connected to the rotary valve 73 of the distributing valve.

In order to start the engine, air is admitted to the distributing valve from a suitable source and by opening a suitable control valve, the air being introduced in proper sequence into the respective cylinders of the engine, forcing the pistons downwardly in succession, and this operation will continue until the engine begins to operate under its own power. In a multiple cylinder engine, such as the one shown in the present instance, there will always be one or more pistons on their working or descending strokes and in readiness to be acted on by the air introduced into the respective cylinders by the air distributing valve. When it is desired to start the engine in a direction opposite to that in which it has been previously running, the air may be admitted through the distributing valve to the respective cylinders in proper sequence, causing the engine to begin its rotation in, say, a forward direction, and the clutch collar 59 is then shifted to reverse the relation between the engine crank shaft and the main rotary valve of the engine, setting the rotary valve for operation of the engine in a reverse direction. The air will then be admitted through the air distributing valve to the different cylinders in proper sequence and will cause reverse operation of the engine.

The present invention provides a simple and practical rotary valve arrangement for internal combustion engines which is located in a lateral offset of the cylinder casing so as to remove it from the excessive heat of the explosion chamber at the head of the cylinder, a single valve serves to control the inlet and exhaust of a plurality of cylinders, the inserted bushing for the valve provides a simple construction whereby accuracy in the timing of the valve for the different cylinders and compensation for wear are provided for, and the relation of the fuel supply and exhaust passages with respect to the valve insures the feeding of the fuel in the best conditions to the cylinder and the exhausting of the highly heated products of combustion has a minimum heating effect upon the valve. Moreover, in applying the valve to an engine having a removable cylinder head, as described, the valve and related parts are conveniently accessible.

I claim as my invention:—

1. In an internal combustion engine, the combination of a cylinder casing formed with adjacently located intake and exhaust manifolds, a separate head connected thereto, and a single valve mounted in the cylinder casing below the parting line between the latter and its head and above the intake manifold and operative to control communication between the intake and exhaust manifolds and the cylinder.

2. In an internal combustion engine, the combination of a cylinder casing formed with a lateral offset containing adjacently located intake and exhaust passages, a head detachably mounted on the cylinder casing, and a rotary valve mounted in the cylinder casing below the parting line between the latter and its head and above the intake manifold and operative to control communication between the intake and exhaust passages and the cylinder.

3. In an internal combustion engine, the combination of a multiple cylinder casing having a lateral offset formed with adjacently located intake and exhaust manifolds extending longitudinally of the casing, a separate head detachably secured to the casing and formed with an explosion chamber for each cylinder, and a rotary valve mounted in the offset of the cylinder casing below the parting line between the cylinder and said head and arranged longitudinally above the intake manifold, the valve being operative to control communication between the intake and exhaust manifolds with respect to the explosion chamber of the head.

4. In an internal combustion engine, the combination of a multiple cylinder casing provided with intake and exhaust manifolds extending longitudinally thereof and having a valve chamber extending longitudinally above the intake manifold, a bushing inserted within said valve chamber and formed with circumferentially spaced and alined ports which communicate respectively with the intake and exhaust manifolds and the cylinder, and a rotary valve mounted in said bushing and having a port operative to control the ports in the bushing.

5. In an internal combustion engine, the combination of a jacketed cylinder casing having a removable head and also having a lateral offset provided with a valve chamber arranged below said head, an intake manifold located below the valve chamber and inclosed by a portion of the jacketing of the cylinder casing, an exterior exposed exhaust manifold at the outer side of the valve chamber and a passage connecting the valve chamber and cylinder, and a valve mounted in the valve chamber and operative to control communication between the intake and exhaust manifolds and the cylinder.

6. In an internal combustion engine, the combination of a cylinder casing provided with intake and exhaust passages and also having a valve chamber, a bushing inserted in said valve chamber and having ports for the intake passage, the exhaust passage, and the cylinder respectively, a rotary valve mounted in said bushing and having a recess in its periphery to alternately establish communication between the intake passage and the cylinder and the exhaust passage and the cylinder, circumferential packing rings interposed between the valve and the bushing at opposite ends of the ports in the latter, and a longitudinal packing strip coöperative with the periphery of the rotary valve and also bearing upon the packing rings.

7. In an internal combustion engine, the combination of a cylinder casing having a lateral offset provided with a valve chamber and intake and exhaust passages, a rotary valve mounted in the valve chamber and operative to control communication between said passages and the cylinder, a separate head detachably connected to the top of the cylinder casing, the offset of the cylinder casing having a slot which is exposed at the parting line between the cylinder casing and its head, and a packing strip arranged in said slot and coöperative with the valve.

8. In an internal combustion engine, the combination of a cylinder casing provided with a valve chamber having a port communicating with the cylinder and inlet and exhaust ports, a valve rotatably mounted in said chamber and having a port for controlling the ports in the cylinder casing, circumferential packing rings on said valve at opposite ends of the port therein, and a packing device coöperative with said packing rings on the valve at a point between the cylinder and exhaust ports.

9. In an internal combustion engine, the combination of a cylinder casing having a valve chamber and passages connecting the same with the cylinder and the intake and exhaust, a valve rotatably mounted in said chamber and having a port coöperative with said passages, circumferential packing rings on the valve at opposite ends of the port therein, and an axially extending packing strip fitted in the valve chamber and bearing on said rings on the valve.

10. In an internal combustion engine, the combination of a cylinder casing provided with a valve chamber and with cylinder, intake and exhaust passages in circumferential alinement, a valve rotatably mounted in said chamber and having a port coöperative successively with said passages, circumferentially extending packing rings arranged on the valve at opposite sides of said port and passages, and a longitudinally extending packing strip bearing on said packing rings of the valve at a point directly between the cylinder and exhaust passages.

11. In an internal combustion engine, the combination of a cylinder casing having cylinder, intake and exhaust passages, a bushing fitted in the casing and having circumferentially spaced ports corresponding to said passages and provided with a longitudinal slot at a point between the cylinder and exhaust passages, and a packing strip operating through said slot in the bushing and bearing on the valve.

12. In an internal combustion engine, the combination of a cylinder casing provided with cylinder, intake and exhaust passages, a bushing fitted in said casing and having circumferentially spaced and alined ports corresponding to said passages and also having a longitudinal slot located at a point between the cylinder and exhaust passages, a valve rotatably mounted in said bushing and having a port arranged to coöperate successively with said ports in the bushing, circumferentially extending packing rings on the valve at opposite sides of said ports, and a longitudinal packing strip operating th..ough said slot in the bushing and bearing on the valve and packing rings.

13. In an internal combustion engine, the combination of a cylinder and piston operative therein, a single valve operative to control the intake and exhaust of the cylinder, and an auxiliary exhaust valve controlled by the piston to exhaust gas from the cylinder prior to the exhaust of gas therefrom by the valve first mentioned.

14. In an internal combustion engine, the combination of a cylinder casing provided with a valve chamber, cylinder, intake and exhaust passages spaced and alined circumferentially thereof, a valve revoluble in said chamber and having a port operative in a direction to connect the cylinder passage successively with the exhaust and then the intake passages, and means for revolving the valve in such direction irrespective of the direction of rotation of the engine crank shaft.

15. In an internal combustion engine, the combination of a cylinder casing formed with intake and exhaust passages, a rotary valve mounted in the casing and having ports to control both the intake and exhaust passages of the casing, and means for imparting rotary motion to said valve in either of two directions relatively to the engine shaft.

16. In an internal combustion engine, the combination of a cylinder casing formed with intake and exhaust passages, a rotary valve mounted in the casing and having ports for controlling both the admission and exhaust of gases with respect to said passages, and means for reversibly driving said valve relatively to the engine shaft comprising a pair of reversely rotated gears, and a clutch for connecting them alternately to the valve.

17. In an internal combustion engine, the combination of a cylinder, a single rotary valve having a recess to control the intake and exhaust of the cylinder, said valve opening to exhaust gas from the cylinder after the piston therein has commenced its exhaust stroke, and an auxiliary exhaust valve controlled by the piston and operative to exhaust gas from the cylinder before the piston therein has commenced its exhaust stroke.

18. In an internal combustion engine, the combination of a cylinder casing, a rotary valve for controlling the intake and exhaust thereof, means for reversibly rotating the valve relatively to the direction of rotation of the engine shaft, and starting mechanism connected directly to and operated in unison with said valve.

19. In an internal combustion engine, the combination of a casing forming a plurality of cylinders and having intake, exhaust and cylinder passages for the respective cylinders, a rotary valve mounted in said casing and having ports operative to connect the cylinder passage successively with the exhaust and intake passages for the respective cylinders, bearings being formed in the casing between adjacent cylinders and coöperating with the rotary valve, pairs of circumferential packing rings on the valve and coöperative with the respective bearings and a longitudinal packing strip coöperative with the valve at a point between the respective cylinder and exhaust ports and bearing on the adjacent packing rings.

20. In an internal combustion engine, the combination with a rotary valve mounted in the engine casing and having ports to control both the intake and exhaust passages of the casing, means for starting the crank shaft of the engine in either direction, and means for revolving said valve in the same direction irrespective of the direction of rotation of the engine crank shaft.

In testimony whereof I have hereunto set my hand in presence of two subscribing witnesses.

HARMON J. KLINE.

Witnesses:
 NELSON M. EDDY,
 M. G. UPDEGRAFF.